United States Patent [19]

Wisner

[11] 4,385,348
[45] May 24, 1983

[54] INVERTER WITH IMPROVED POWER FACTOR CONTROL

[75] Inventor: Gary E. Wisner, Boaz, Ala.

[73] Assignee: Park-Ohio Industries, Inc., Shaker Heights, Ohio

[21] Appl. No.: 292,824

[22] Filed: Aug. 14, 1981

[51] Int. Cl.³ ............................................. H02P 13/20
[52] U.S. Cl. ................................... 363/79; 219/10.77; 363/37; 363/49; 363/96
[58] Field of Search .................... 363/37, 58, 49, 79, 363/96, 136; 219/10.77; 323/207

[56] References Cited

U.S. PATENT DOCUMENTS

| | | |
|---|---|---|
| 3,290,581 | 12/1966 | Hooper . |
| 3,328,596 | 6/1967 | Germann et al. . |
| 3,506,907 | 4/1970 | Porterfield et al. . |
| 3,566,243 | 2/1971 | Landis .................................. 363/37 |
| 3,657,634 | 4/1972 | Eastop ............................. 219/10.77 |
| 3,718,852 | 2/1973 | Bailey .............................. 219/10.77 |
| 3,725,768 | 4/1973 | Pelly . |
| 3,725,770 | 4/1973 | Bailey . |
| 3,757,197 | 9/1972 | Bailey .............................. 219/10.77 |
| 4,039,926 | 8/1977 | Steirgerwald ....................... 363/138 |
| 4,047,092 | 9/1977 | Bendzsok ............................ 363/135 |
| 4,195,233 | 3/1980 | Udvardi-Lokos ..................... 363/49 |
| 4,244,015 | 6/1981 | Beebe ..................................... 363/8 |
| 4,245,291 | 1/1981 | Tsutsui et al. ......................... 363/68 |
| 4,247,890 | 1/1981 | Cutler et al. ......................... 363/137 |
| 4,253,140 | 2/1981 | McMurray ............................ 363/96 |
| 4,258,416 | 3/1981 | Walker et al. ....................... 363/137 |
| 4,275,438 | 6/1981 | Stirniman ............................. 363/136 |
| 4,280,038 | 7/1981 | Havas et al. ...................... 219/10.77 |
| 4,286,315 | 8/1981 | Johnson ............................... 363/87 |
| 4,293,905 | 10/1981 | Opal ................................... 363/124 |
| 4,296,462 | 10/1981 | Gurr .................................... 363/96 |
| 4,312,031 | 1/1982 | Kudor ................................... 363/41 |
| 4,323,958 | 4/1982 | Nowell ................................. 363/28 |
| 4,323,959 | 4/1982 | Check ................................... 363/40 |
| 4,325,112 | 4/1982 | Otsuka ................................. 363/42 |

FOREIGN PATENT DOCUMENTS 1079363  6/1980  Canada .
720638  3/1980  U.S.S.R. .

Primary Examiner—William H. Beha, Jr.
Attorney, Agent, or Firm—Body, Vickers & Daniels

[57] ABSTRACT

There is provided an improvement in a power inverter for converting D.C. voltage into an alternating voltage by alternating gating D.C. current across a load. This type of inverter employs a gating circuit for providing gating signals in two sets of switches at a frequency which controls the power factor of the voltage and current applied to the load, means for detecting the power factor, means for comparing the detected power factor with a reference signal indicative of a desired operating power factor and means for adjusting the frequency in accordance with the comparison whereby the power factor tends to be at the desired power factor level. The improvement in this type of inverter is the provision of means for changing the reference signal during the operation of the inverter in accordance with a control signal so that the desired power factor can be changed during start up of the inverter.

12 Claims, 3 Drawing Figures

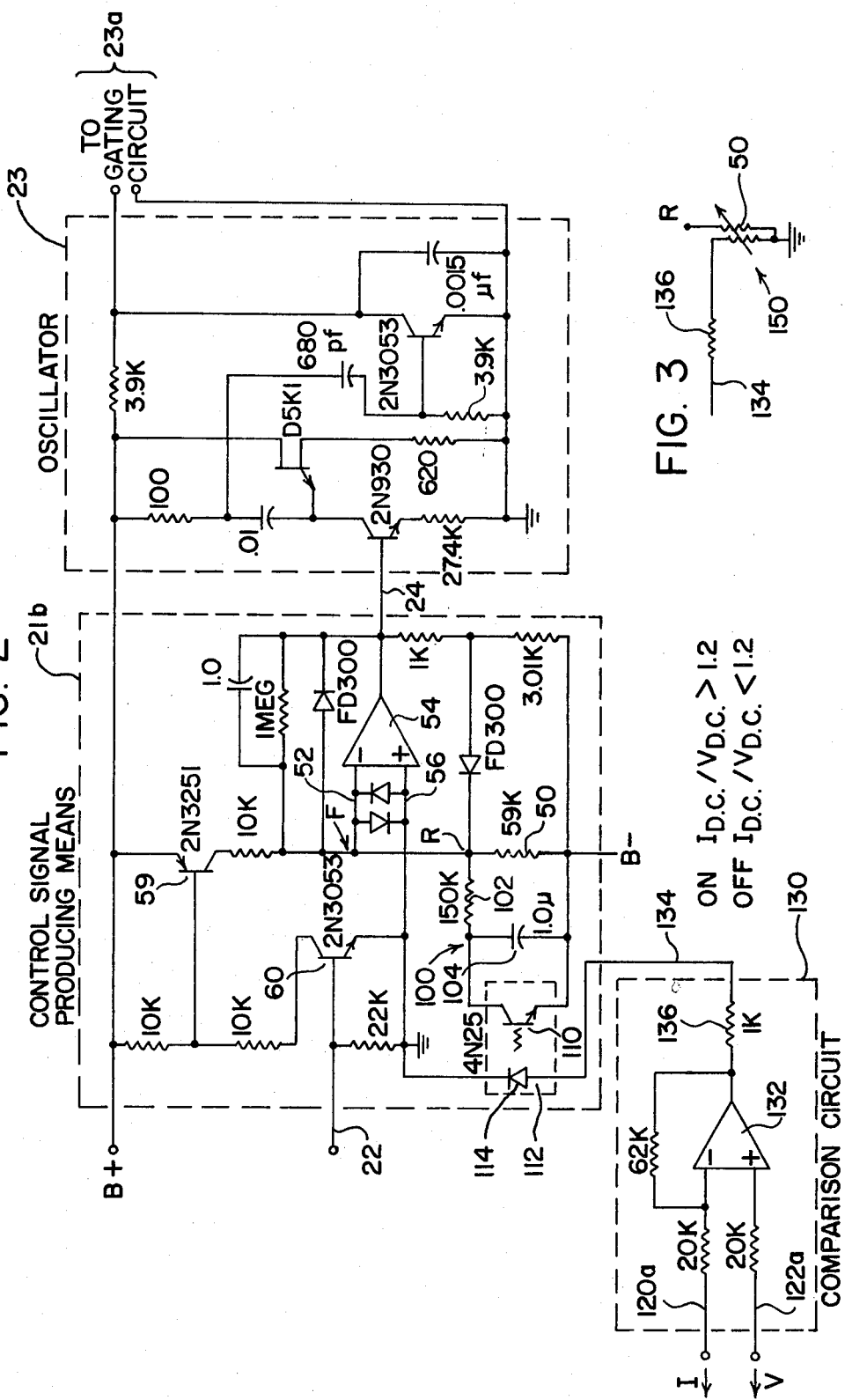

INVERTER WITH IMPROVED POWER FACTOR CONTROL

The present invention relates to a power inverter and more particularly to an improvement in a power inverter relating to controlling the power factor thereof.

INCORPORATION BY REFERENCE

The present invention relates to an inverter circuit as disclosed in U.S. Pat. No. 3,718,852. This patent is incorporated by reference as background information and as a disclosure of the circuit to which the present invention is particularly adapted. Also, U.S. Pat. No. 3,725,770 is incorporated by reference.

BACKGROUND OF INVENTION

In recent years, substantial effort has been devoted to the provision of solid-state inverters for use with induction heating equipment. This effort has presented substantial technical difficulties in that the inverter concept is more applicable to use with a load that has a fixed impedance and requires a generally fixed power factor for operating the inverter. In induction heating, a fixed load is not possible. Workpieces of different sizes, different compositions are to be inductively heated by the inverter. Rapid heating cycles for workpieces are different to varying degrees and cause the inverter to experience substantial load changes. In addition, as a workpiece is being heated inductively, its permeability changes. This causes a change in reflected impedance during heating of a single workpiece. In many instances, the inverter is actuated without a workpiece in the coil. This causes still a further variation in the power factor for a given frequency. All of these variations in the load applied across the output of a solid-state inverter, when used for induction heating, cause difficulties in the field. In some instances, the inverter will not start. When this occurs, an operator must have substantial experience to detect the reason for the inability to energize the inverter. Also, the switching devices in the inverter (SCRs or thyristors) have a turn off time during which a reverse voltage must be applied across the switching device to cause commutation. Fluctuation of the parameters of the load can sometimes prevent turn off and cause damage to the switching devices. If this occurs, the inverter must be repaired. In view of this operating characteristic, inverters generally have some type of circuit for assuring sufficient turn off time of the switching devices is maintained. One of these arrangements is shown in U.S. Pat. No. 3,718,852 wherein the power factor of the load itself is controlled to a desired level so that the necessary turn off time is assured from cycle-to-cycle of the inverter. Thus, in this type of control arrangement, the power factor or phase angle of the current and voltage across the load is detected and compared to a fixed level or phase angle, indicated as R in U.S. Pat. No. 3,718,852. Based upon this comparison, the frequency of the gating oscillator is modified to change the operating frequency of the inverter. The power factor is essentially a desired preselected power factor during operation of the inverter. In practice, the biasing resistor for controlling the reference signal R is 59K ohms. This produces an operating power factor of approximately 0.80 and more specifically 0.78. This power factor is selected to provide a compromise between the desired power factor when the inverter is started up and the desired power factor when the inverter is running. When running, the power factor can be in the neighborhood of 0.90 or even 0.95. Because this high power factor will prevent the inverter from starting up, the reference signal R is modified to about the 0.80 level so that the inverter will start up and continue to run. This compromise is essential because the inverter, which is a parallel compensated inverter, is a current source and is very difficult to start up at high power factors.

THE INVENTION

The present invention relates to an improvement in a basic inverter as shown in prior U.S. Pat. No. 3,718,852 which improvement allows the inverter to start up at an optimum power factor and run at a different optimum power factor.

In accordance with the present invention, there is provided an improvement in a power inverter of the type having first and second switching branches connected across a load, such as an induction heating coil, a gating circuit for providing gating signals to the alternating branches in accordance with a comparison between the sensed power factor across the load and a desired reference signal indicative of a desired power factor and means for adjusting this frequency of the gating circuit in accordance with the comparison so that the power factor tends to be the desired power factor. The improvement includes means for changing the reference signal during the operation of the inverter in accordance with a control signal created during operation of the inverter. In this manner, the desired power factor can be changed at least between two fixed values for creating different conditions for starting and for running the inverter.

In accordance with another aspect of the present invention, there is provided an arranement for detecting the load power factor and for changing the reference signal of the circuit as illustrated in prior U.S. Pat. No. 3,718,852 when the power factor is substantially beyond a preselected level. This level occurs during start up and during certain adverse load conditions, both of which require a greater turn off time for the switching devices and a substantially different gating frequency.

The primary object of the present invention is the provision of an improvement in a power inverter, which improvement involves an arrangement for changing the adjusted, fixed, desired power factor to which the inverter is controlled during adverse load conditions, such as during starting of the inverter.

Another object of the present invention is the provision of an inverter, as defined above, which inverter can have at least two different desired power factors and an arrangement for shifting between these desired power factors in accordance with sensed characteristics of the load being powered by the inverter.

Yet another object of the present invention is the provision of an improvement in an inverter, as defined above, which improvement allows the inverter to be used for induction heating installations, such as heating forging billets, wherein start up of the inverter needs a large current compared to the voltage. Also there is a large change in current with respect to time at the switching devices. These factors result in a short turn off time for the switching devices and require a lower output frequency. An adjustment to meet these adverse conditions is obtained by using the present invention.

In accordance with still a further object of the present invention, there is provided an improved power inverter, of the type defined above, which allows a high controlled power factor of the inverter during normal load conditions and a different, lower power factor during adverse load conditions, such as inverter start up.

Still a further object of the present invention is the provision of an inverter, as defined above, which inverter does not demand a compromise between two extreme power factor requirements.

Yet another object of the present invention is the provision of an inverter, as defined above, which inverter can be used with long leads. Such leads increase the inductive reactance and change the characteristics of the load as seen for the inverter.

These and other objects and advantages will become apparent from the following description taken together with the drawings described below:

BRIEF DESCRIPTION OF DRAWINGS

FIG. 2 is a wiring diagram showing the preferred embodiment of the present invention with components labeled for disclosure of the actual components employed; and, FIG. 3 is a partial wiring diagram illustrating a modification of the invention as shown in FIG. 2.

PREFERRED EMBODIMENT OF THE INVENTION

Figure 1:
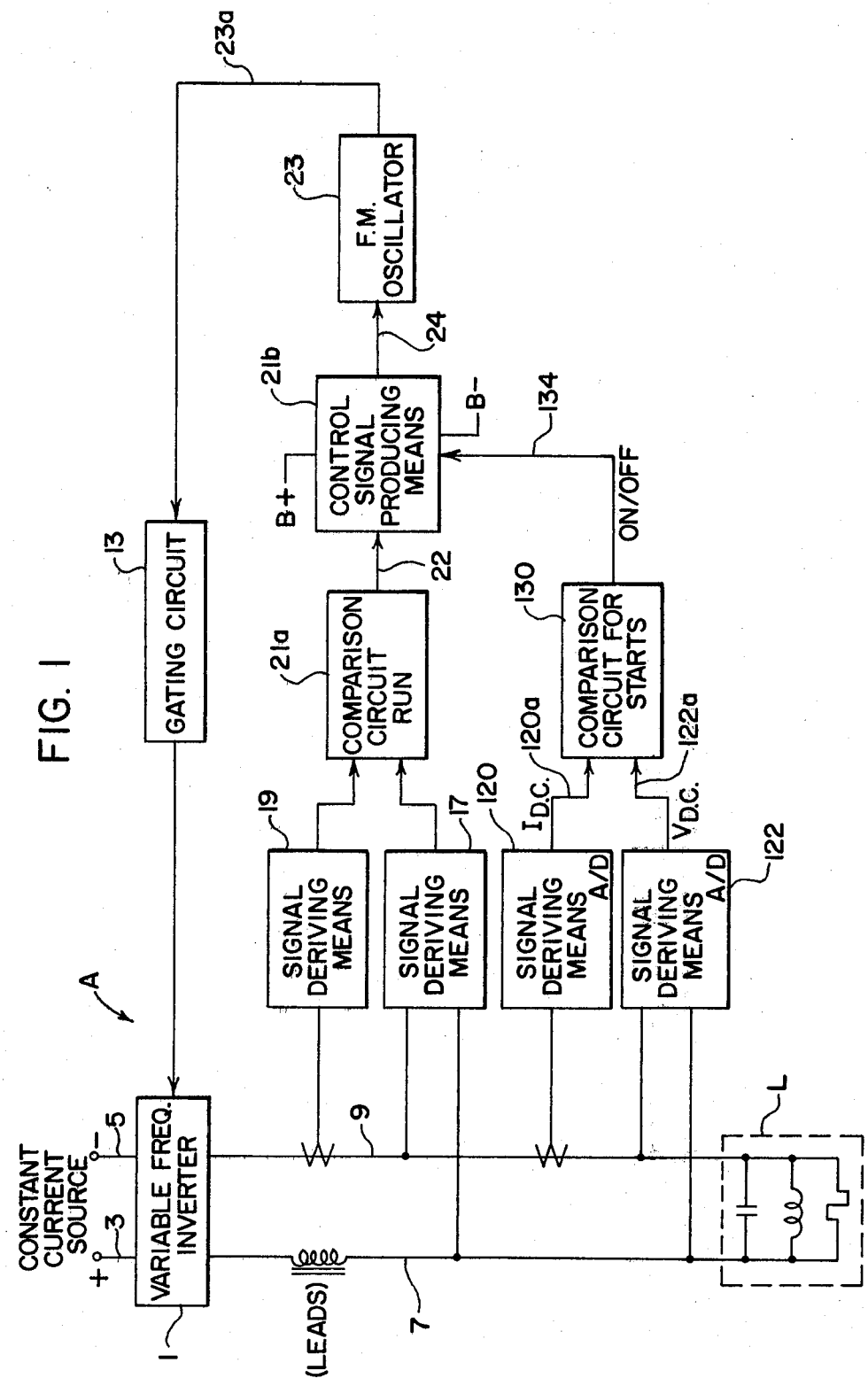
FIG. 1 is a block diagram of a control arrangement for a power inverter and employing the present invention.

Referring now to the drawings wherein the showings are for the purpose of illustrating a preferred embodiment of the invention only and not for the purpose of limiting same, FIG. 1 shows an induction heating apparatus A using a variable frequency inverter 1 having a pair of D.C. input terminals 3, 5 and a pair of A.C. output or load circuit conductors 7, 9. The input terminals 3, 5 of inverter 1 are adapted to be connected to a suitable source of constant direct current which may comprise a current smoothing inductor or choke fed by a phase controlled power rectifier of conventional design and shown schematically in prior U.S. Pat. No. 3,725,770. Inverter 1 converts the constant current from the rectifier into a variable frequency alternating current which is supplied by leads or conductors 7, 9 to a tank load L. While any suitable inverter may be used for this purpose, the parallel compensated inverter has proven to be particularly advantageous. As is well known in the art, such an inverter is formed by appropriately interconnecting a plurality of switching elements that are gated in sequence to create the alternating current. The frequency of the alternating current output depends on the gating rate, as determined by a gating circuit 13, which is controlled by a frequency modulated oscillator 23 having an input line 24 with a voltage that determines the output frequency of oscillator 23. This oscillation creates timing pulses that are directed to gating circuit 13 through leads 23a. Oscillator 23 ouputs a plurality of these short timing pulses to activate gating circuit 13 to trigger the switching devices in inverter 1. The output frequency of the inverter is one-half the frequency of oscillator 23. Preferably the voltage applied to tank load L is controlled by means of a phase-controlled rectifier bridge comprising a constant current source with the firing angle of the rectifier and bridge being controlled by a conventional closed-loop regulator, all of which is well known in the inverter art. Load L generally comprises an induction heating coil with a parallel capacitor which is tuned so that the load circuit has a high Q and a leading power factor characteristic during normal load impedance and fundamental frequency conditions. Under these normal conditions, the alternating current that inverter 1 supplies to load L will lead the alternating voltage across the load by a predetermined phase angle. For reasons already explained, the impedance of the load is likely to vary and the actual phase angle between the load current and voltage tends to deviate from the predetermined desired value. In order to preserve a substantial constant phase angle, prior U.S. Pat. No. 3,718,852 discloses a system that controls the operating frequency of oscillator 23 by supplying it with a control signal in line 24, the magnitude of which reflects the difference or error between the actual and desired phase angle or power factor. Responding to the control signal in line 24, oscillator 23 will vary its operating frequency. This changes the frequency of the gating pulses from gating circuit 13 to change the frequency of the current supplied to the load. Consequently, the frequency change modifies the power factor in a direction toward the preselected desired power factor. As so far described, FIG. 1 is essentially the structure shown in prior U.S. Pat. No. 3,718,852, except signal deriving means 17, for detecting the load voltage, and signal deriving means 19 for detecting the load current, are directed to comparison circuit 21a having an output signal 22 indiciative of the actual phase angle or power factor detected by means 17 and means 19. The voltage level of the signal in line 22 is directed to a control signal producing means 21b which creates the voltage level on line 24. In the prior patent, units 21a and 21b are combined as common unit 21. They are illustrated in the present disclosure as being separate so that it is apparent that the present invention relates to the concept of modifying the second stage 21b of the feedback signal creating device 21 shown in the prior patent.

Referring now to FIG. 2 wherein the components are labeled to show the preferred circuitry arrangement used to perform the frequency modifying function as generally done in the prior patent. Control signal producing means 21b includes input 22 from comparison circuit 21a so that the signal providing means 21b is driven in accordance with the voltage level on line 22. This is somewhat different than the circuit shown in FIG. 2 if the prior patent; however, the same operating characteristics pertain. A resistor 50 is connected to the negative bus B— and creates the reference signal indicated as signal R. Thus, current flow through resistor 50 creates a biasing signal R which is directed to the inverting input 52 of an operational amplifer 54. The non-inverting input 56 is connected to ground. Also connected to inverting input 52 is the collector of transistor 59. The operation of transistor 59 is controlled by transistor 60 whose base is biased by comparison circuit 21a, as shown in FIG. 1. As discussed in prior U.S. Pat. No. 3,718,852, the output of operational amplifier 54 is controlled by the desired phase angle or power factor determined by resistor 50 and the actual phase angle or power factor as determined by the voltage on line 22. Thus, the error signal or voltage level on line 24 controls oscillator 23 to change the frequency of gating circuit 13 so that the desired power factor will be obtained.

In accordance with the present invention, there is provided a means for changing the magnitude of the reference signal R when the power factor of load L is substantially beyond a desired magnitude. In accordance with this aspect, a shunt circuit 100 is provided across resistor 50 and includes resistor 102, smoothing capacitor 104 and an optical coupler 112. In practice, coupler 112 is a combination of LED 114 and photosensitive switching transistor 110. Such an optical coupler is sold under the designation 4N25. When a signal from the comparison circuit 134 biases diode 112 ON, transistor 110 is also biased ON, creating a path of low resistance in series with resistor 102. Since the resistance through the leg parallel to the resistor 50 is then approximately the value of resistor 102, the parallel combination of resistor 50 and resistor 102 reduces the resistance of the combination, increasing the value of R. When the diode is negatively biased, or otherwise turned off, there is an open circuit in series with resistor 102, and an infinite resistance in parallel with resistor 50. This maintains its predetermined value. As the changing value of resistor 50 alters the value of R, the operational amplifier 54 will supply an output signal proportional to the changing magnitude of the difference between reference signal R, and signal F.

The change in signal R is to be used, in accordance with the preferred embodiment of the invention, only when the power factor exceeds approximately 20% of the normal desired power factor. To actuate transistor 110 at this sensed level, the current and voltage of load L is obtained by appropriate signal deriving means 120, 122, similar to deriving means 17, 19 of the prior patent. These two means produce a voltage level in lines 120a, 122a which are indicative of the general magnitude of load current and load voltage. In accordance with the preferred embodiment, these magnitudes are compared in comparator circuit 130 having an operational amplifier 132 and an output 134. When the current is high compared to the voltage, comparator circuit 130 provides a control signal in line 134 which actuates switch or transistor 110. As can be seen, the actual phase angle is not detected by comparator 130. Only a ratio of current to voltage is obtained. When this ratio exceeds approximately 1.2, shunting circuit 100 is actuated. This actuation drops the control power factor of signal producing means 21b until the transistor 110 is turned off by the ratio of load current to load voltage being less than 1.2. In this embodiment, the LED 112 and the level of voltage in line 134 in controlled by resistor 136 to cause a shift in the control power factor at a desired level which level or threshold is indicated to be 1.2. If a bad load is created during normal operation of inverter 1, comparison circuit 130 could again operate to reduce reference signal R. It is envisioned that circuit 130 would be used primarily for starting; however, the constant monitoring of current and voltage could produce a shift in the control power factor or phase angle by controlling reference signal R during normal operation of the inverter. In accordance with the invention, the power factor reference is changed during the operation of the inverter. In a more limited aspect, the change is made by sensing a characteristic of the inverter, i.e. phase angle or power factor.

Referring now to FIG. 3, a modification is illustrated wherein resistor 50 is one element of a thermistor 150 which is connected to resistor 136 in line 134. In this arrangement, a reference level is adjusted continuously by the voltage applied to line 134 by circuit 130. Of course, this arrangement could have a threshold and would not be actuated until a voltage exceeds preselected value, such as a 1.0 or 1.2 ratio between the current and voltage signal being compared by circuit 130.

It should be recognized that while the preferred embodiment is designed to work only after the power factor exceeds some preset level, it can be employed at more than one undesirable level. Since the basis of the invention is a changeable or variable reference level signal, as controlled by the ratio of load current and load voltage, any circuit which would vary the value of resistor 50 and consequently the value of signal R could be used.

Having thus described the invention, the following is claimed:

1. In a power inverter for converting D.C. voltage into an alternating voltage by alternately gating a first circuit including a first gatable switch and a load for passing current through said load in a first direction and a second circuit including a second gatable switch and said load for passing current through said load in a second direction opposite to said first direction, said power inverter having a gating circuit for providing gating signals to said first and second switches at a frequency which controls the power factor of the voltage and current applied to said load, means for detecting said power factor, means for comparing said detected power factor with a reference signal indicative of a desired operating power factor, and means for adjusting said frequency in accordance with said comparison whereby said power factor tends to be said desired power factor, the improvement comprising: means for changing said reference signal during operation of said inverter in accordance with a control signal.

2. The improvement as defined in claim 1 including means for comparing the load voltage and the load current and means for creating said control signal when said comparison exceeds a selected value.

3. The improvement as defined in claim 2 wherein said selected value is a power factor substantially different from said desired power factor.

4. The improvement as defined in claim 1 wherein said changing means includes means for changing said reference signal to a fixed new reference signal during operation of said inverter.

5. The improvement as defined in claim 4 wherein said reference signal is the current through a biasing resistor and said changing means includes means for switching an additional resistance in parallel with said biasing resistor.

6. The improvement as defined in claim 5 wherein said switching means includes a light responsive transistor and said changing means includes means for exposing said transistor to a light source by said control signal.

7. The improvement as defined in claim 1 wherein said control signal is variable by the load power factor and means for changing said reference signal when said control signal varies beyond a selected threshold level.

8. The improvement as defined in claim 7 including means for varying said reference signal in accordance with the magnitude by which said control signal exceeds said selected threshold level.

9. The improvement as defined in claim 7 wherein said changing means includes means for changing said reference signal to a fixed new reference signal during operation of said inverter.

10. The improvement as defined in claim 9 wherein said reference signal is the current through a biasing resistor and said changing means includes means for switching an additional resistance in parallel with said biasing resistor.

11. The improvement as defined in claim 7 wherein said reference signal is the current through a biasing resistor and said changing means includes means for switching an additional resistance in parallel with said biasing resistor.

12. The improvement as defined in claim 1 wherein said reference signal is the current through a biasing resistor and said changing means includes means for switching an additional resistance in parallel with said biasing resistor.

* * * * *